(12) United States Patent
Buzdar et al.

(10) Patent No.: US 8,330,988 B1
(45) Date of Patent: Dec. 11, 2012

(54) METHOD AND APPARATUS FOR COORDINATING ELECTRONIC AND HARDCOPY DISPLAY MEDIUMS

(76) Inventors: Faizan Nabi Buzdar, Multan (PK); Sabika Nazim, Islamabad (PK); Misbah Ullah, Islamabad (PK)

( * ) Notice: Subject to any disclaimer, the term of this patent is extended or adjusted under 35 U.S.C. 154(b) by 1026 days.

(21) Appl. No.: 12/235,178

(22) Filed: Sep. 22, 2008

Related U.S. Application Data

(60) Provisional application No. 60/994,738, filed on Sep. 21, 2007.

(51) Int. Cl.
  *G06K 15/00* (2006.01)
(52) U.S. Cl. ............. 358/1.18; 283/2; 283/3; 358/1.9; 715/212; 715/214; 715/217; 715/249; 715/252
(58) Field of Classification Search .............. 358/1.9, 358/1.18; 283/2, 3; 715/212, 214, 217, 249, 715/252
See application file for complete search history.

(56) References Cited

U.S. PATENT DOCUMENTS

| | | | |
|---|---|---|---|
| 5,745,110 A * | 4/1998 | Ertemalp | 715/764 |
| 6,452,694 B1 * | 9/2002 | Eisenberg et al. | 358/1.18 |
| 7,104,034 B2 * | 9/2006 | Stemmle | 53/493 |
| 2002/0116417 A1 * | 8/2002 | Weinberg et al. | 707/517 |
| 2006/0010155 A1 * | 1/2006 | D'Hers et al. | 707/102 |

* cited by examiner

*Primary Examiner* — Steven Kau
*Assistant Examiner* — Peter K Huntsinger
(74) *Attorney, Agent, or Firm* — Chapin IP Law, LLC

(57) ABSTRACT

A scheduling application prints a portable pocket sized hardcopy of information items such as scheduled items and task lists, and prints the information onto the pocket sized hardcopy in a consistent manner on each visible side of the hardcopy by rotating and inverting the printed material in anticipation of subsequent folding. The consistent manner encompasses inverting and arranging portions of the hardcopy along fold lines to enable folding that results in an upright orientation to the displayed text and figures. Conventional scheduling mechanisms are typically unwieldy to quickly initiate and enter a single item or entry. Electronic mediums need to be powered on, a keystroke, stylus, or pointing device sequence applied to access the corresponding scheduling or notepad application, and the information entered. Conventional paper mediums tend to be bulky and thus typically in a briefcase or purse, and often have binders or covers as well as page tabbing systems that need to be navigated.

16 Claims, 18 Drawing Sheets

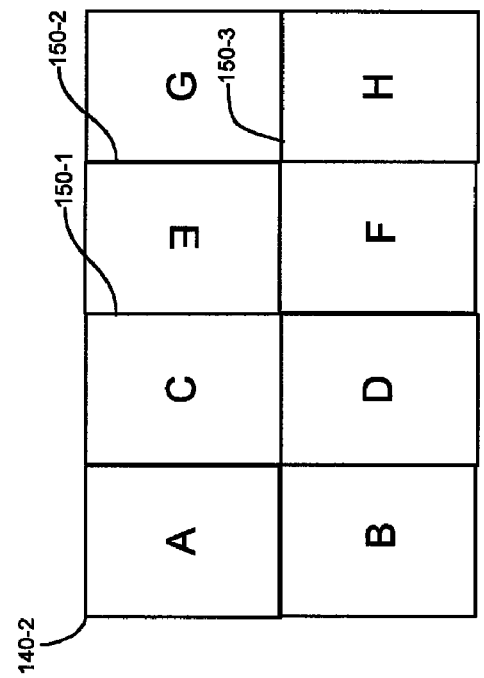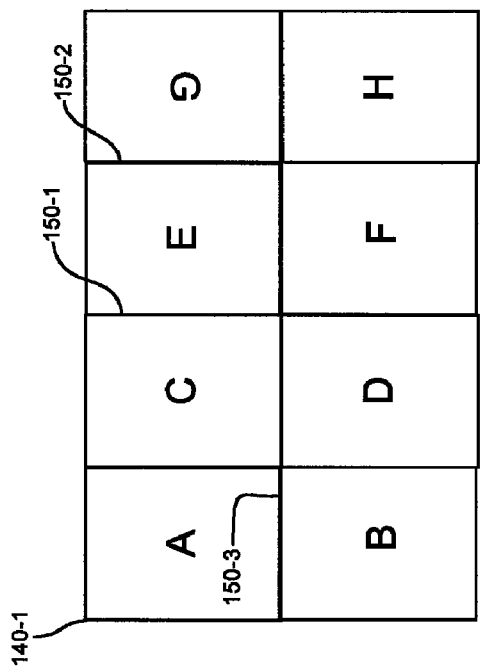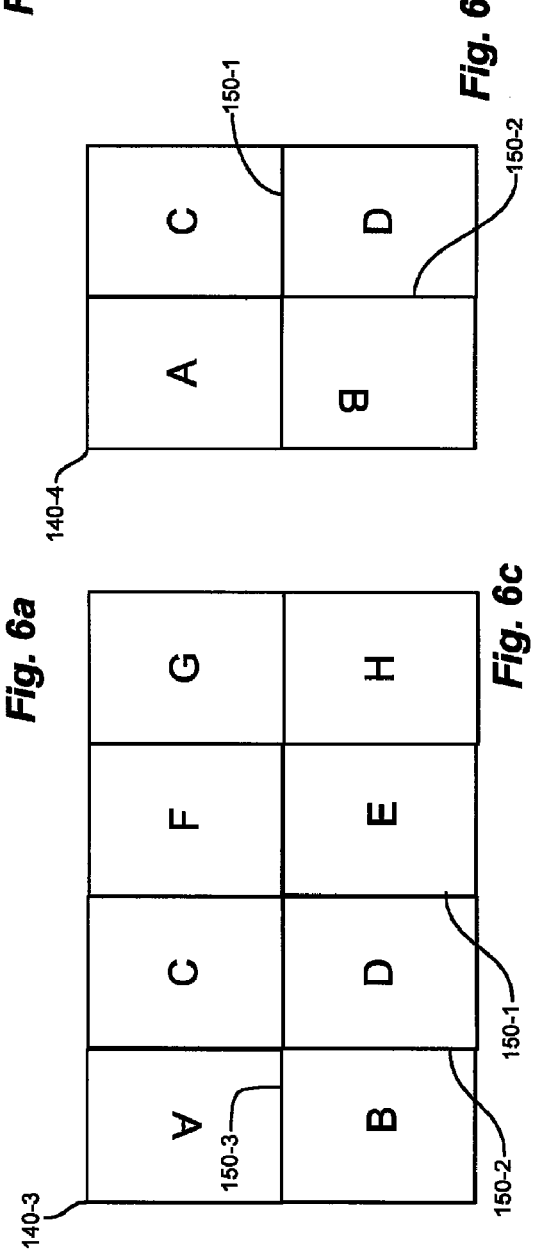

METHOD AND APPARATUS FOR COORDINATING ELECTRONIC AND HARDCOPY DISPLAY MEDIUMS

RELATED APPLICATIONS

This Patent Application claims the benefit under 35 U.S.C. §119(e) of the disclosure of U.S. Provisional Patent Application No. 60/994,738, filed Sep. 21, 2007, entitled "METHOD AND APPARATUS FOR PROVIDING PAPER SCHEDULE," incorporated herein by reference.

BACKGROUND

Personal organizers for time and task management are often valuable tools for highly regimented and scheduled individuals who prefer or require a structured approach to everyday activities. Serving as modern equivalents to the proverbial "string tied on a finger," organization tools provide a mechanism for identification, entry, completion, and reconciliation of tasks. A user identifies tasks, such as meetings, actions and errands, and records them for occurrence or completion at a particular place and time. Typically arranged around a calendar, an organizer tool allows a daily accounting of tasks, and may also provide for reprioritization and identifying completion of the tasks. The actual nature of the scheduled tasks varies by the habits and role of the individual, however, such organizers generally itemize the activities and actions so that as sense of closure or completion may be enumerated and satisfied.

Traditional organizers have taken the form of a specialized notebook or bound volume having pages specialized for various organization aspects (such as daily, weekly and/or monthly page layouts) and a set of tabs or inserts for efficiently indexing particular entries. As with many information based models, microprocessor technology has recast the traditional paper systems, and recent decades have marked the introduced electronic versions of former paper based mechanisms. Modern marketing now touts various electronic organizer configurations ranging in scope and portability from a fully contained PDA (Personal Digital Assistant) including a cellphone, audio and video to desktop PC applications having various connectivity options. Nonetheless, despite the electronic advances providing for efficient transmission, storage and replication of a task organizer, paper continues to be an effective medium for effectively storing and reconciling scheduling information.

SUMMARY

Modern consumer electronics provide a plethora of personal management devices, applications, and services for maintaining a detailed accounting of one's affairs, such as appointments, meetings, finances, and virtually any business engagement, personal obligation or logistic detail. Personal organizers and devices having similar capabilities are available in permutations and combinations along with cellphone, PC, audio and video capability to suit almost any set of needs and/or requirements, providing a broad range of options for the gadgeteer. Nonetheless, many people continue to rely on the simplicity and consistency of paper as a medium of information management. A readily available paper memo can be quickly accessed in a pocket, handbag or wallet, and quickly updated by jotting a handwritten notation. Even the simplest of electronic mediums requires a keystroke sequence to initialize a device and enter an update such that a fleeting idea may be lost by the time it can be electronically entered and stored. Further, electronic devices are susceptible to loss and physical damage, a risk less prevalent with a simple paper memo, note or pad. In other words, paper maintains value as a non-volatile storage medium despite the proliferation of parallel gadgets in the electronic age.

Conventional scheduling mechanisms, therefore, suffer from the shortcoming of being unwieldy to quickly initiate and enter a single item or entry. Electronic mediums need to be powered on, a keystroke, stylus, or pointing device sequence applied to access the corresponding scheduling or notepad application, and the information items entered. Conventional paper mediums tend to be bulky and thus may not fit well in a briefcase or purse, and often have binders or covers as well as page tabbing systems that need to be navigated before entering an information item Accordingly, configurations disclosed herein substantially overcome such shortcomings by generating a foldable, portable pocket sized hardcopy of information items such as scheduled items and task lists, and print, or render, the information onto the pocket sized hardcopy in a consistent manner on each visible side of the hardcopy by rotating and inverting the printed material in anticipation of subsequent folding, which tends to invert portions of paper with respect to other portions. In the example shown, the consistent manner encompasses inverting and arranging portions of the hardcopy along fold lines to enable folding that results in an upright orientation to the displayed text and figures after the folding.

A scheduler application operable to print the hardcopy allows item entry for items including calendar events, list events for eminent items from the calendar or other sources, and a "thoughtpad" that allows entry of web pages or portions for future reference. The scheduler application provides monthly, weekly, and daily views of items, and correlates the items with the list of eminent items, more commonly referred to as a "to do" list. The hardcopy therefore represents a paper format synchronization, or "papersync", of the electronic version accessible via the scheduler application. Users may print a hardcopy "papersync" of the scheduled items and lists for carrying on their person, and have it readily available to quickly jot down updates for later entry, such as additional items (events) and completion of items. Since such a hardcopy is readily recreatable, there is little risk of loss or damage, in contrast to expensive electronic devices. The claimed approach, therefore, integrates the reliability and persistence of an electronic scheduler with the convenience and portability of a time-honored paper medium.

In further detail, configurations disclosed herein provide a method of coordinating rendered output among multiple visual display mediums by identifying a set of information for efficient recall, and demarcating the information in a tabular form, the tabular form defining tabular cells including a portion of the information. In the example arrangement, the information defines schedule items and the tabular form corresponds to a folded paper printout, or hardcopy output. A graphical user interface (GUI) based application identifies a particular independent rendering format for each tabular cell, such that each tabular cell corresponds to a tabular region of output, in which the independent rendering format based on an expected rendered orientation of the information, such that each region of output is a fold-defined portion of the hardcopy output (i.e. sheet of paper). The application thus renders the information on a physical medium such that subsequent deformation of the physical medium renders the information in a consistent form for viewing and recall, in which the deformations define the tabular regions of output on the physical medium. Rendering the information includes printing on a paper hardcopy, such that deformation defines folds between printed tabular cells, the folds thus defining sections for receiving a tabular cell. Deforming further includes folding such that opposed folded sections share a common upright orientation for reading. In the example disclosed, rendering further includes a booklet format such that deformation defines a 2*2 matrix of sections, and a pocket format such that deformation defines a 2*4 matrix of sections, in which each rendered section based on a particular rendering format defining the inversions.

The claimed invention is disclosed as a scheduling application on a computerized device having a display, keyboard, and pointing device for interfacing with a user. Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

FIGS. 6a-6d are examples of hardcopy output generated by the scheduling application;

FIG. 7 is a monthly view of scheduled items in the scheduling application of FIG. 1;

FIG. 8 is a weekly view showing a particular day in the scheduling application of FIG. 1

FIG. 9 is a daily view in the scheduling application of FIG. 1;

FIG. 10 is an item entry screen of an event for the scheduling application of FIG. 1;

FIG. 11 shows item entry for a web entry in the scheduling application of FIG. 1;

DETAILED DESCRIPTION

The disclosed system and method is depicted as a computer scheduling application deployed as software on a processing device such as a PC interfacing with a suitable output device such as a printer for printing a hardcopy, or paper, form of the schedule. The selected schedule is printed, or rendered, by the printer in a variety of forms discussed below, responsively to the scheduling application. Configurations herein therefore provide a readily portable paper schedule foldable in a form for consistent upright viewing due to the printer inverting and exchanging (swapping) printed regions such that folded sections of the paper schedule do not appear upside down. In this manner, the flexibility of the paper schedule combines with the persistence and modifiability of an electronic version of the schedule as stored by the scheduling application.

Figure 1:
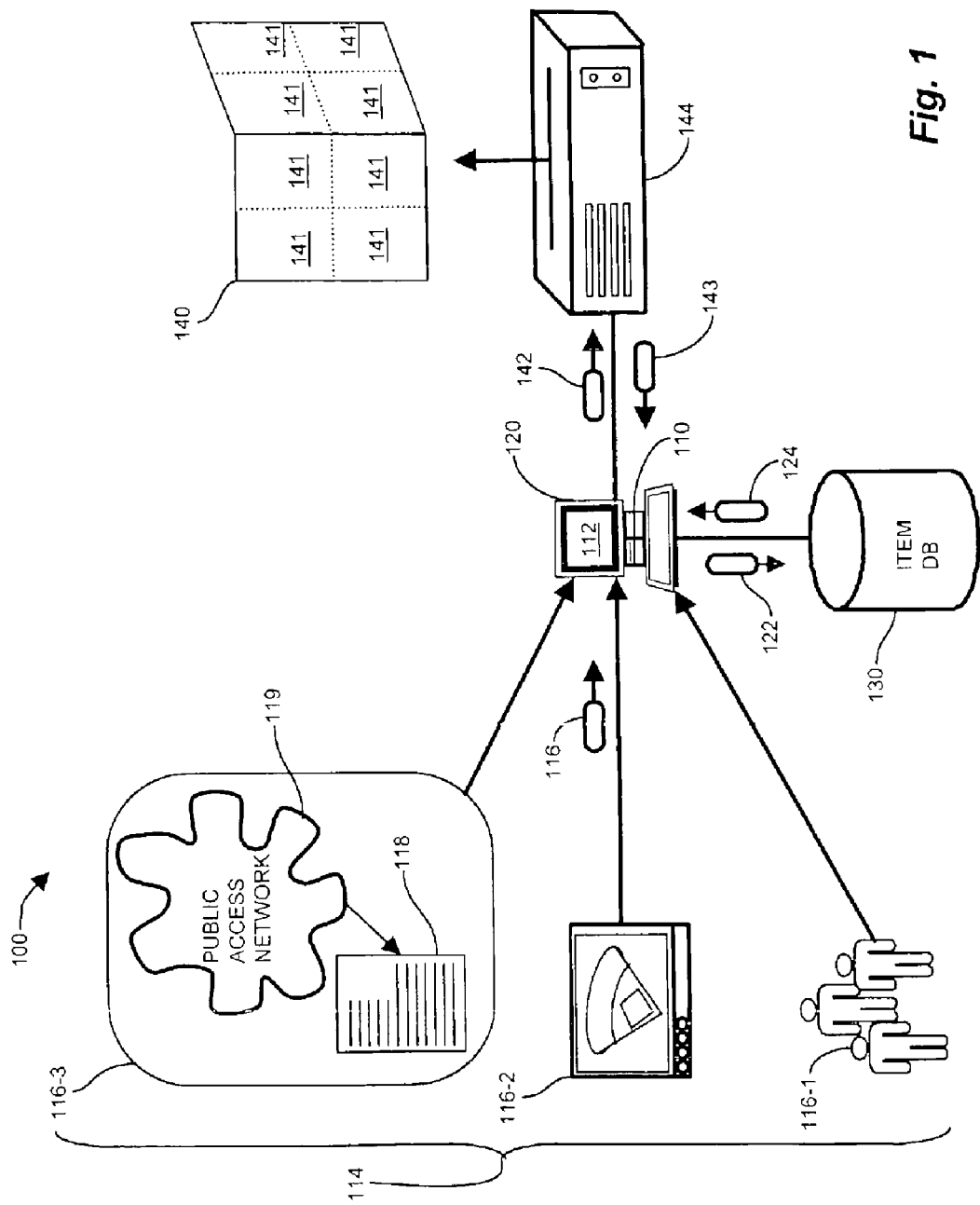
FIG. 1 is a context diagram of a computing device suitable for use with a scheduling application depicting the present invention.

FIG. 1 is a context diagram of a computing device suitable for use with a scheduling application depicting the present invention. Referring to FIG. 1, in a managed information environment 100, a scheduling application 110 operable by a user on a computing device 120 employs a graphical user interface (GUI) 112 for receiving and displaying schedulable items (items) 116 from various entities 114. The items 116 include meetings 116-1, such as appointments and conference calls, events 116-2 such as sporting events and performances, and noteworthy information 116-3, such as webpage entries obtained from a public access network 119 such as the Internet, hereinafter referred to as thoughtpad entries 116-3.

The items 116-1 . . . 116-3 are receivable as items 116 (generally) by the scheduling application 110 via the GUI 112, and may be stored 122 and extracted 124 via an item database (DB) 130 through operation of the scheduling application 110, detailed further below. Upon user request, the scheduling application 110 generates current items 116 on a hardcopy output 140, denoted as a papersync form, which may be carried and edited by a user via hand markups. The scheduling application 110 generates a printer command 142 indicative of a set of items 116, typically a day or week's worth, and directs the a hardcopy device 144 such as a printer to generate the hardcopy output 140 form of the items 116 in the command 142. The hardcopy output 140, typically a single paper sheet, has the property that it may be deformed (folded) in a predetermined manner such that the displayed (printed) items maintain a common orientation so that the user/reader need merely open the folds and read/review the events without turning the paper upside down. The folded hardcopy output 140 therefore has sections 141 defined by the folds in the paper such that printed information is assigned to a particular section 141.

The hardcopy output 140, or papersync, allows a user to enjoy the convenience and freedom of a paper schedule that may be quickly marked up or edited, and without concern of loss or damage that may occur with more extravagant mechanisms, such as electronic devices. Paper and simple jotted notes still remain a quick, effective, and simple manner of non-volatile storage, and the hardcopy output 140 presented herein offers such advantages while maintaining the automation and manipulation capabilities of the electronic scheduling application 110.

The folded hardcopy output 140 permits one to carry data (schedule items 116) on a paper print out which fits in a pocket or wallet after 3 simple folds without requiring any cuts, staples or glue. The papersync output is therefore a print format that is pulling scheduling data 124 from the DB 130 for printing simple calendars, to-do lists, notes and any other kind of document including but not limited to spreadsheets, charts, news clippings and images; or the special print formats that are designed to make printed documents compact and portable. In the examples shown, 3 different print formats are disclosed, however others will be apparent. A classic view prints traditional calendar views, i.e. Year, Month, Week or Day, depending on the current selection, to-do lists, notes, news clippings, images, spreadsheets and charts etc. The classic format, also allows you to print a combination of data types, for e.g. you can print your task lists with the selected calendar view. A Booklet form provides a 2-fold format that prints your data on the top half of the printed paper, while the remaining half remains free form. The size of the document, once folded, is roughly about that of a booklet. A user may simply carry it in folders, books, files, bags or briefcases. The Booklet print can be folded in less than 20 seconds, and requires no cuts, glue, or stapling on the printed paper. A pocket view provides a 3-fold format that prints data in 8 sections. The size of the document, once folded, is roughly about that of a wallet. It's a format that one can easily carry in their wallets and pockets. The pocket print can be folded in less than 30 seconds and requires no cuts, glue, or stapling on the printed paper.

Figure 2:
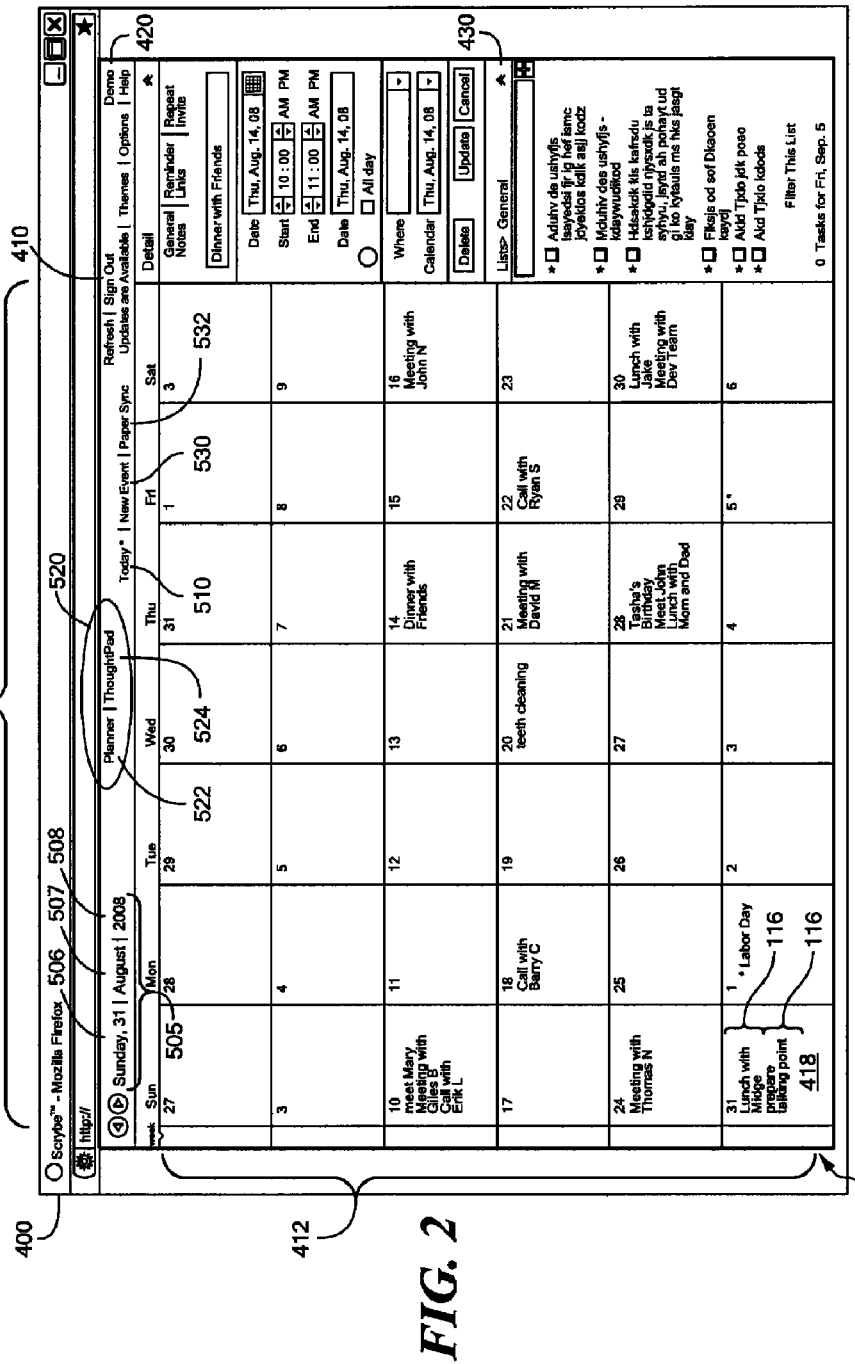
FIG. 2 is an example GUI (Graphical User Interface) screen of the scheduling application.

FIG. 2 is an example GUI (Graphical User Interface) screen of the scheduling application. Referring to FIG. 2, a GUI display 400 includes a calendar window 410, a detail window 420, and a list window 430. The calendar window 410 generally shows scheduled items 116 at the selected detail level (monthly, weekly, daily), and the detail window 420 displays specific times for an item 116 selected in the calendar window 410. In the example shown, a month view displays weeks 412 and days 414 in a calendar grid 416 for each day 418. Each day 418 lists scheduled items 116 for that day, space permitting. The lists window 430 displays task lists that typically include at least some of the items 116 from the calendar window 410 for a particular day. The list window 430 also allows items to be transferred from a calendar day 418 to the list window 430, and removed from the list window 430 upon completion.

Navigation between different display screens 400 is accomplished via transition buttons. A set of view buttons 505 allows transition between day 506, week 507 and month 508 views. A today button 510 displays the day 506 view for the current date. A mode toggle 520 allows a user to select a planner 522 button for viewing and updating schedule items 116, and a thoughtpad button 524 for viewing and updating thoughtpad entries. A new event 530 button allows entry of new items 116, and a papersync 532 button performs generation of the hardcopy output 140, discussed further in FIG. 3 below.

Figure 3:
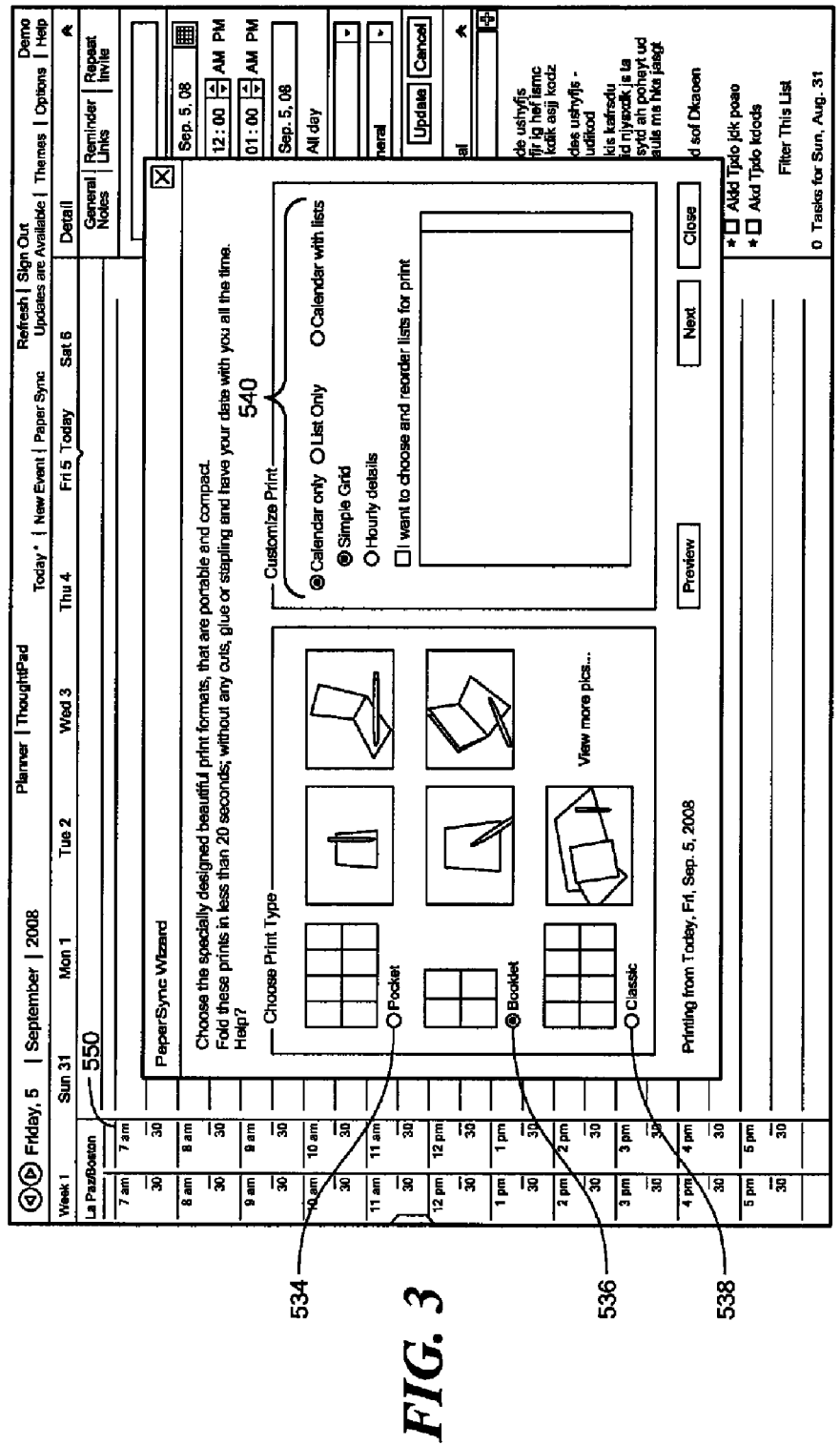
FIG. 3 is an output selection screen of the scheduling application for generating the hardcopy output

FIG. 3 is an output selection screen of the scheduling application for generating the hardcopy output. Referring to FIG. 3, the papersync 532 selection displays an output options window for selecting a format for the hardcopy output 140. The available options each have buttons corresponding to a pocket format 534, a booklet format 536, and a classic format 538, discussed further below in FIGS. 6a-6d. Each of the hardcopy outputs, in the example arrangement, prints a paper sheet as the hardcopy output 140.

Print options buttons 540 optionally suppress particular details for clarity. The hardcopy options include a pocket form selection 534, a booklet form selection 536, and a classic form selection 538. The pocket selection 534 has 3 folds to form a ⅛ sheet folded size; the booklet selection 536 defines two fields to form a ¼ sheet folded sized, and the classic selection 538 defining no fold lines. For the folded selections 534 and 536, particular sections are inverted and/or swapped so that the folded output 140 maintains printed text in an upright orientation. Deformation (fold) defined sections are discussed further below with respect to FIGS. 6a-6d.

Figure 4:
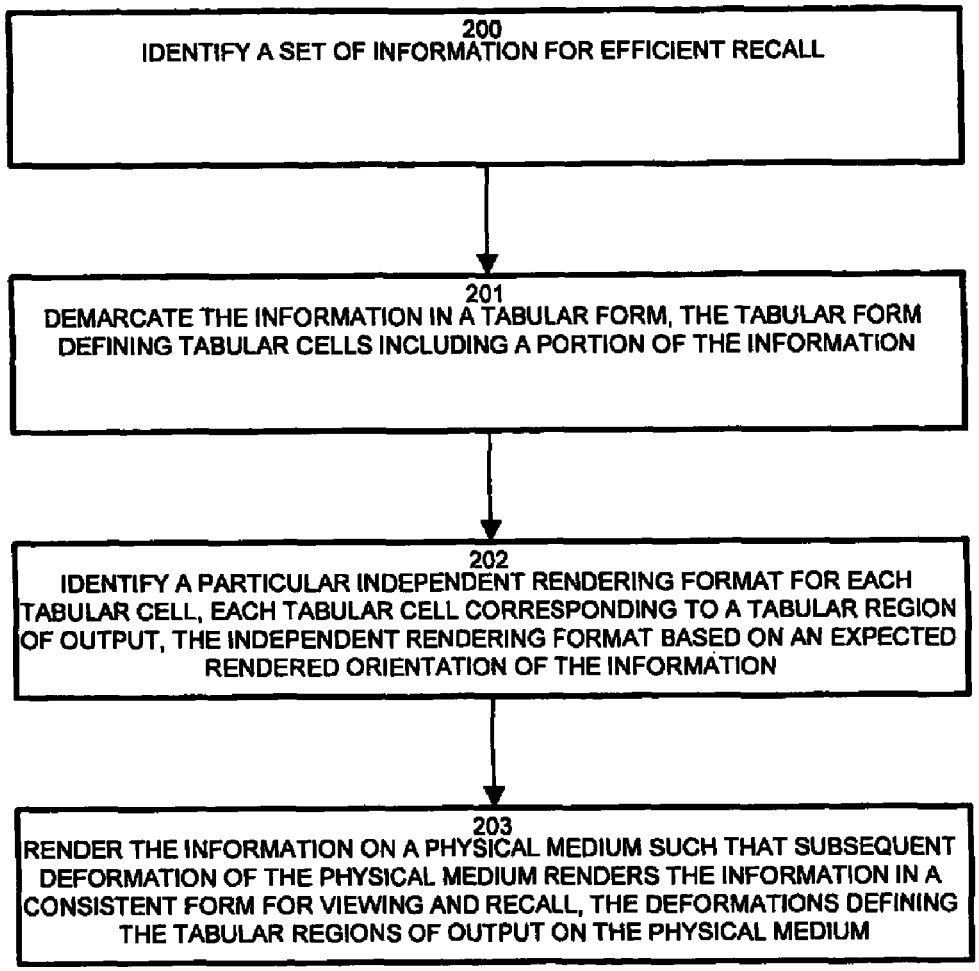
FIG. 4 is a flowchart of schedule management using the scheduling application in the system of FIG. 1.

FIG. 4 is a flowchart of schedule management using the scheduling application in the system of FIG. 1. Referring to FIGS. 1 and 4, the method of coordinating rendered output among multiple visual display mediums as disclosed herein includes, at step 200, identifying a set of information for efficient recall. In the example configuration, the set of information includes items 116 received by the scheduling application 110. The scheduling application 110 demarcates the information in a tabular form, such that the tabular form defines tabular cells including a portion of the information items 116, as depicted at step 201. The scheduling application 110 identifies, via user input, a particular independent rendering format 534 . . . 538 for each tabular cell, in which each tabular cell corresponds to a tabular region of output, as disclosed at step 202. The independent rendering format is based on an expected rendered orientation of the information items 116, such that folds in the printed output define the tabular regions of output, shown as sections 141 on the hardcopy output 140, and each section 141 is independent in that it may be swapped with other sections 141 or inverted without inverting the remaining sections 141. Following organization of the information items 116 (schedule items) by the scheduling application 110, the application 110 renders the information on a physical medium such that subsequent deformation of the physical medium (hardcopy output) 140 renders the information in a consistent form for viewing and recall, in which the deformations define the tabular regions of output as sections 141 on the physical medium 140, as depicted at step 203. Depending on the rendering format, certain sections 141 are inverted (printed upside down) and/or swapped with other sections 141 such that folding the hardcopy output 140 results in the inverted sections 141 appearing upright and the swapped sections opposing particular other sections 141 on the folded (deformed) hardcopy output 140.

Figure 5:
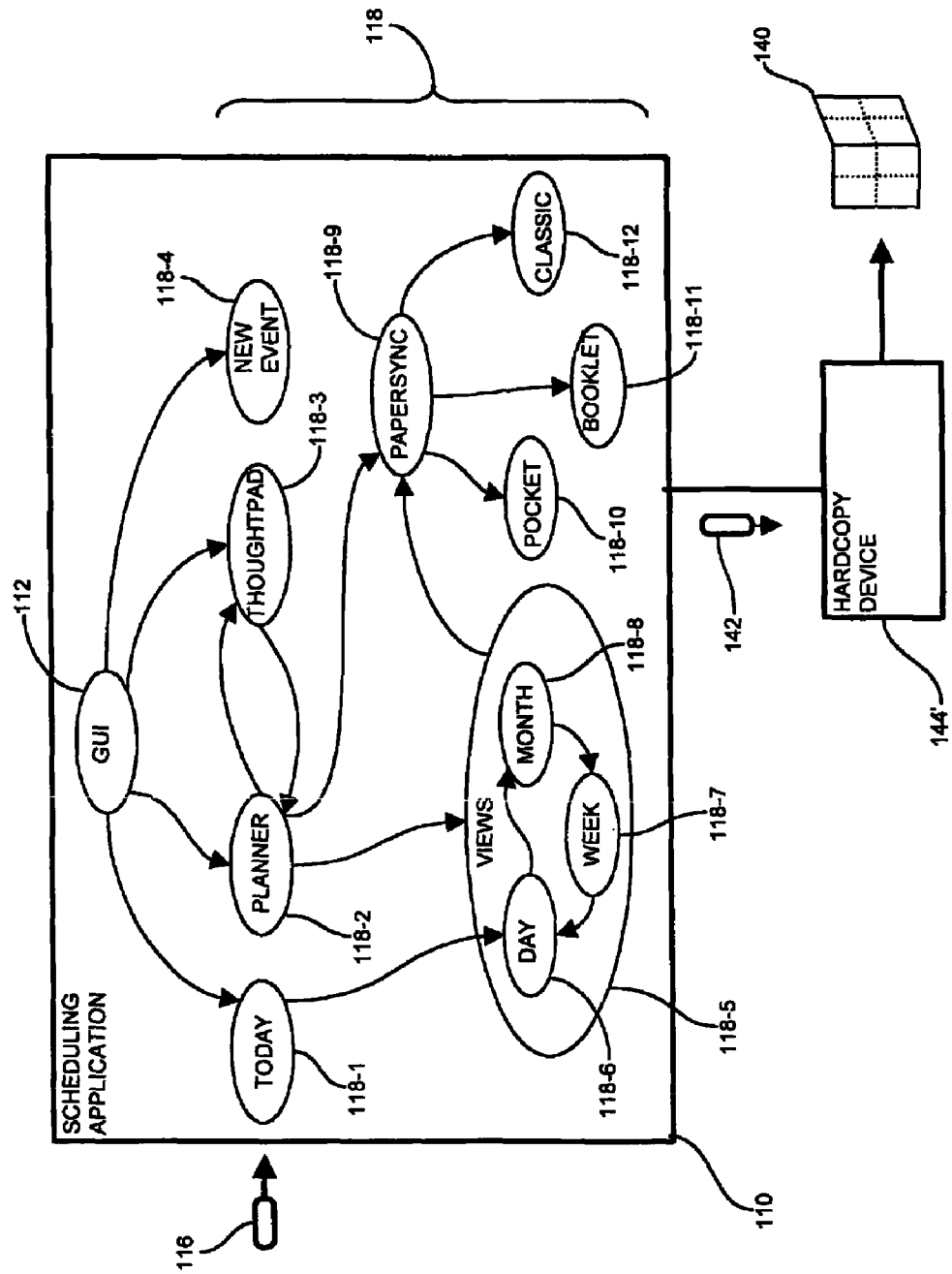
FIG. 5 is a block diagram of the scheduling application in the environment of FIG. 1.

FIG. 5 is a block diagram of the scheduling application in the environment of FIG. 1. Referring to FIGS. 1 and 5, the scheduling application 110 is responsive to the GUI 112 for receiving new items 116 and for displaying and organizing existing items 116 from the item DB 130. The GUI 112 is operable in a number of states 118-1 . . . 118-12 (118 generally), each typically corresponding to a particular display screen of the GUI 112. An example control flow through the states 118 is shown, although other state transitions may be performed via the GUI 112. A today 118-1 state is selectable to view the items of the current day, which is a specific instantiation of a day view state 118-6, discussed below. A planner 118-2 state and a thoughtpad state 118-3 are toggled, such that the planner state 118-2 transitions to other states for manipulating meeting 116-1 and event 116-2 items, while the thoughtpad state categorizes noteworthy information 116-3 such as web pages for saving and/or referring to others, discussed further below in FIG. 11. A new event 118-4 state allows entry of a new time specific item (i.e. event or meeting), discussed further below with respect to FIG. 10. A views state 118-5 allows the screen display of items 116 to toggle between daily 118-6, weekly 118-7, and monthly 118-8 views, discussed further below in FIGS. 9, 8 and 7, respectively. From any of the views 118-5, the user may enter papersync 118-9 state to print the hardcopy output 140 via a hardcopy device 144', typically an attached printer 144. The available output states correspond t the output formats and include pocket state 118-10, booklet state 118-11 and classic state 118-12.

The hardcopy output 140 is a paper version of several days of scheduled items 116 easily foldable along fold lines printed on the paper version such that the fold lines define deformation regions, or sections 141, printed such that the folded version renders the items displayed in each region in an upward manner. Conventional folded paper renders one side of the fold upside down with respect to the other side. Accordingly, FIGS. 6a-6d are examples of hardcopy output generated by the scheduling application.

FIGS. 6a-6d are examples of hardcopy output 140 generated by the scheduling application. Referring to FIGS. 6a and 3, a particular arrangement of hardcopy output 140-1 is shown having an inverted section G. Three fold lines 150-1, 150-2 and 150-3, respectively, define deformations, or folds, for producing a pocket size 534 form. When folded on fold line 150-3, the hardcopy output 140-1 renders both sections G and H in the same upright orientation for viewing, when the fold line 150-3 is disposed upward. The above described inversion inverts the items 116 displayed in section G via a vector output rendering that enables inversion of section G independently of the remaining sections.

FIG. 6b shows another hardcopy output 140-2 having an orientation that inverts section E, thus rendering section E upright on the outside of the folded pocket 534 version. Alternative configurations may invert both sections E and G on the same hardcopy output 140. In FIG. 6c, section A is inverted, and sections F and E are swapped, thus illustrating the independent nature of the sections 141 when rendered on the output hardcopy. FIG. 6d shows the booklet 536 rendering format inverting section B, such that folds alone fold line 150-1 renders sections 141 A and B upright with respect to fold 150-2 as the booklet 536 "hinge."

Figure 7:
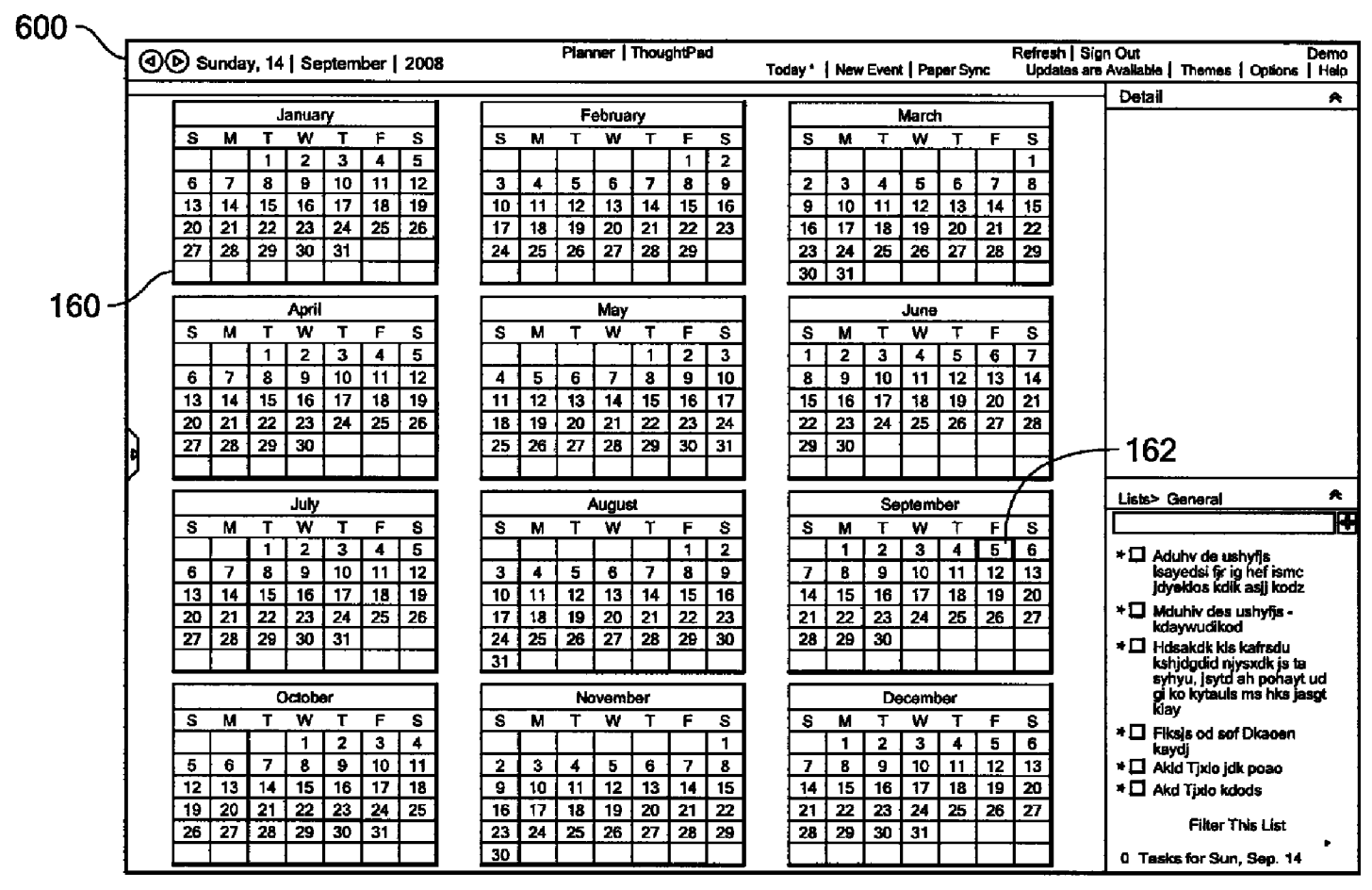

FIG. 7 is a monthly view of scheduled items in the scheduling application of FIG. 1. Referring to FIGS. 1, 5 and 7, the scheduling application 110 displays individual months 160, and allows selection of a particular day 162 for further examination and update. The monthly view 600 is entered from the month state 118-8 of the view buttons 505.

Figure 8:
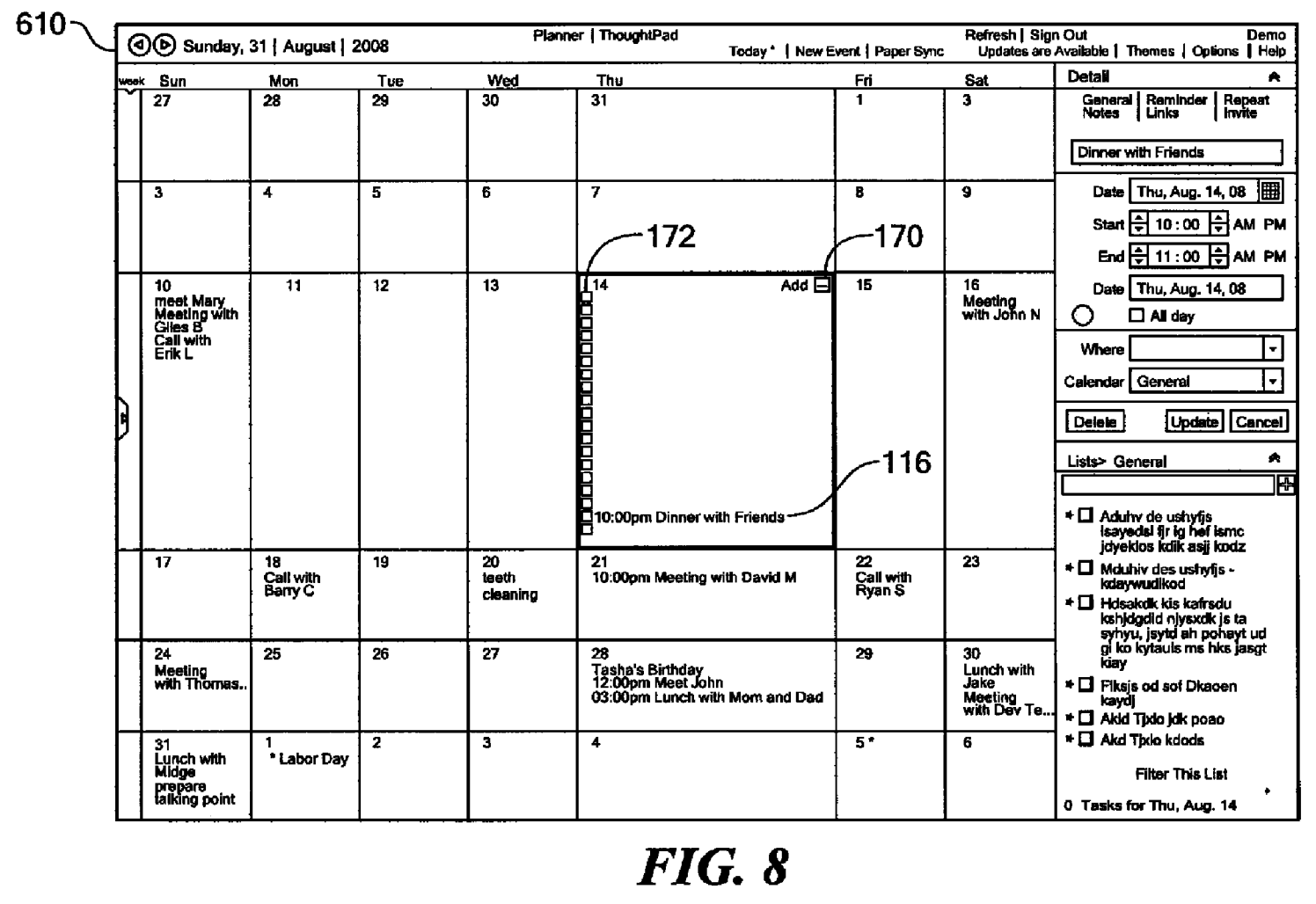

FIG. 8 is a weekly view 610 showing a particular day 170 in the scheduling application of FIG. 1, along with items 116 scheduled for that day. As in FIG. 2, days 418 are displayed in a grid of weeks 412, while a selected day 170 is shown in an expanded form. The selected day 170 includes an hourly designation bar 172 that lists hourly designations of items 116 for that day. As with the monthly view 600, a drill down operation is selectable by clicking on the day 170 to transition to the daily view 620 of FIG. 9, below. The weekly view 610 is entered from the week selector 118-7 of the view buttons 505.

Figure 9:
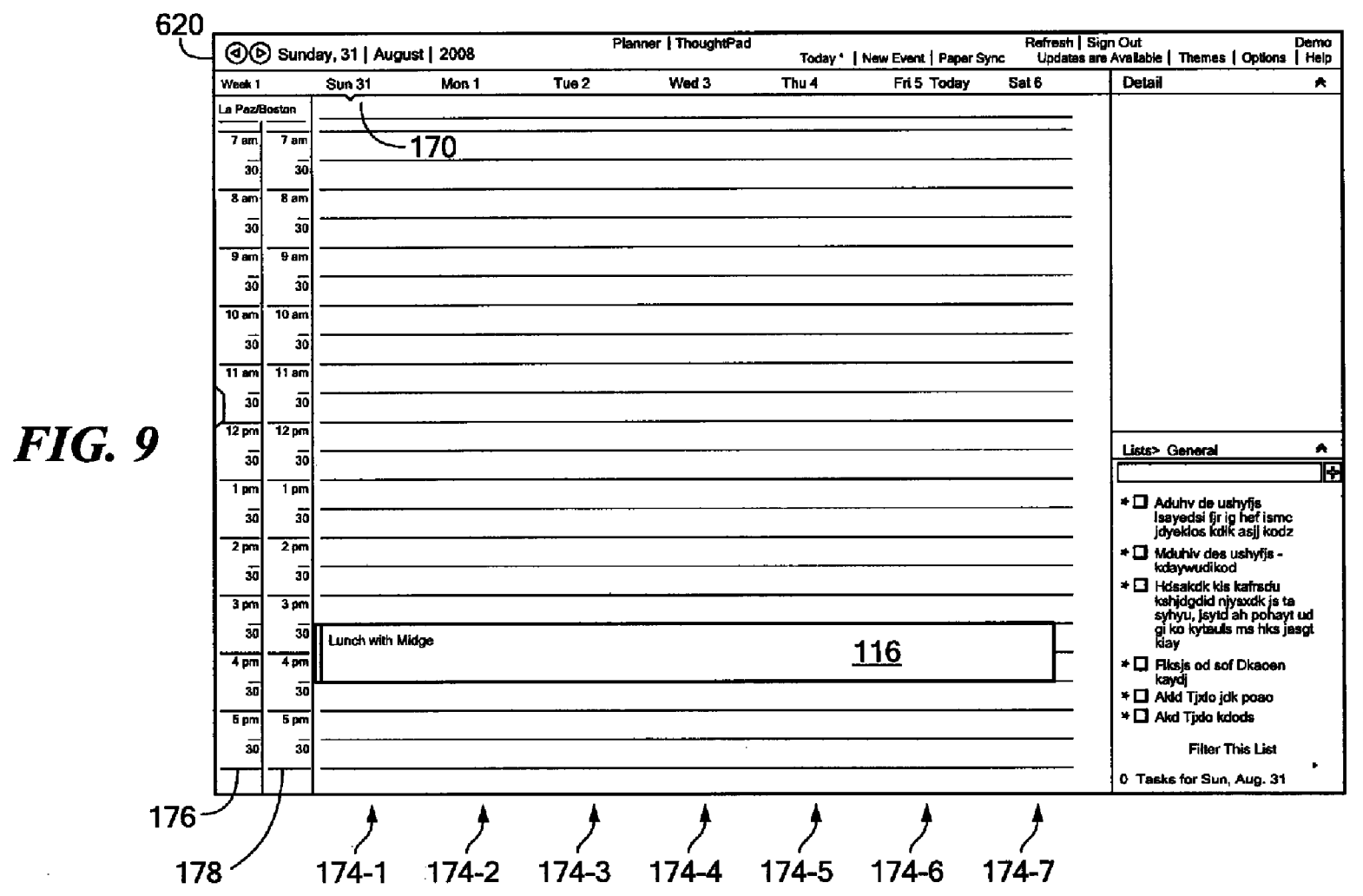

FIG. 9 is a daily view 620 in the scheduling application of FIG. 1. Referring to FIGS. 1, 8 and 9, the selected day 170 is displayed as a column 174-1, while successive days are displayed in columns 174-2 . . . 174-7. The hourly designation bar 172 expands to a local time bar 176, correlating the items 116 with the local time, and also to an alternate time zone 178, displaying a time zone of interest. The time zone of interest may be, for example, a time zone local to a meeting attendee or affiliate office, and is discussed further in copending U.S. patent application Ser. No. 12/235,162, filed concurrently, entitled "METHOD AND APPARATUS FOR COORDINATING SCHEDULING ACROSS GLOBAL TIME ZONES," incorporated herein by reference. The daily view 620 is entered from the daily selector 118-6 of the view buttons 505.

Figure 10:
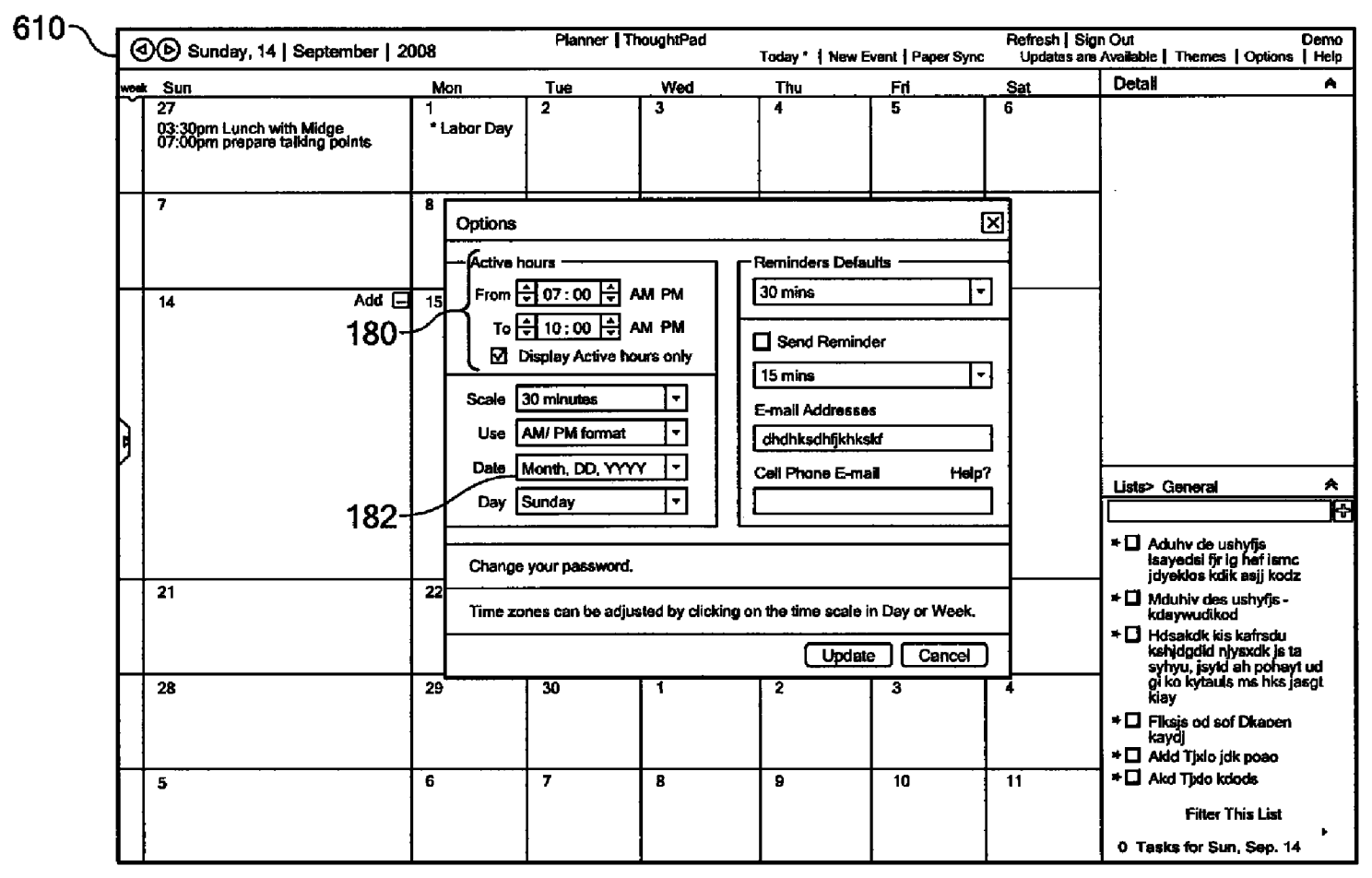

FIG. 10 is an item entry screen of an event for the scheduling application 110 of FIG. 1. Referring to FIGS. 1 and 10, the new event button 530 initiates the new event window 630 as a pop-up. The new event window 630 has a time selector 180 and a date selector 182 for designating the schedule time, as well as a text description of the item 116.

Figure 11:
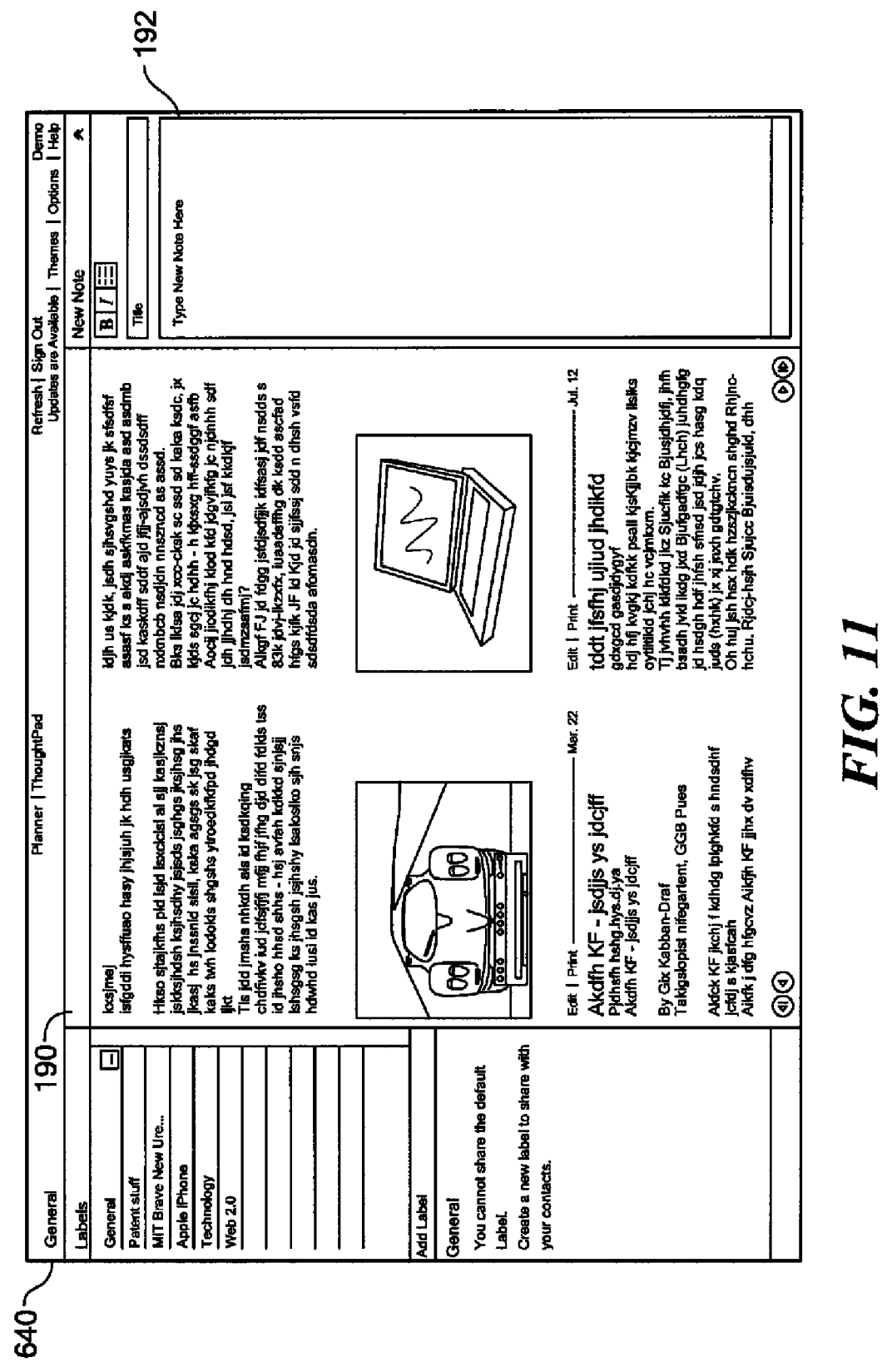

FIG. 11 shows item entry for a web entry in the scheduling application 110 of FIG. 1 using a noteworthy item 116-3 screen 640 for retaining web pages and other documents of interest for future recall, invoked from the thoughtpad button 524. Various webpages 190 may be stored and cataloged in this manner, and notes window 192 accepts text entries for future reference and correlation with schedule lists 430.

Figure 12:
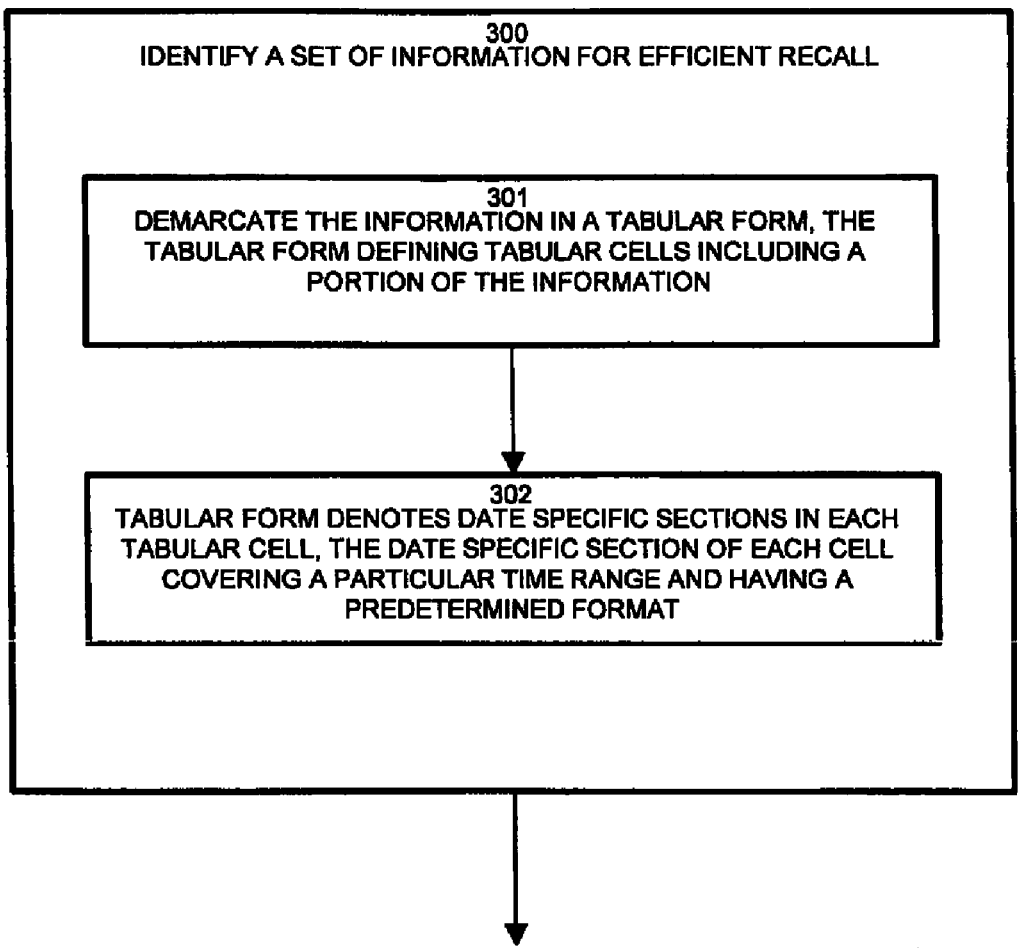
FIGS. 12-14 show a flowchart of hardcopy output generation using the scheduling application of FIG. 5 and FIGS. 15-18 show alternate configurations of screen rendering of physical hardcopy output.
Figure 13:
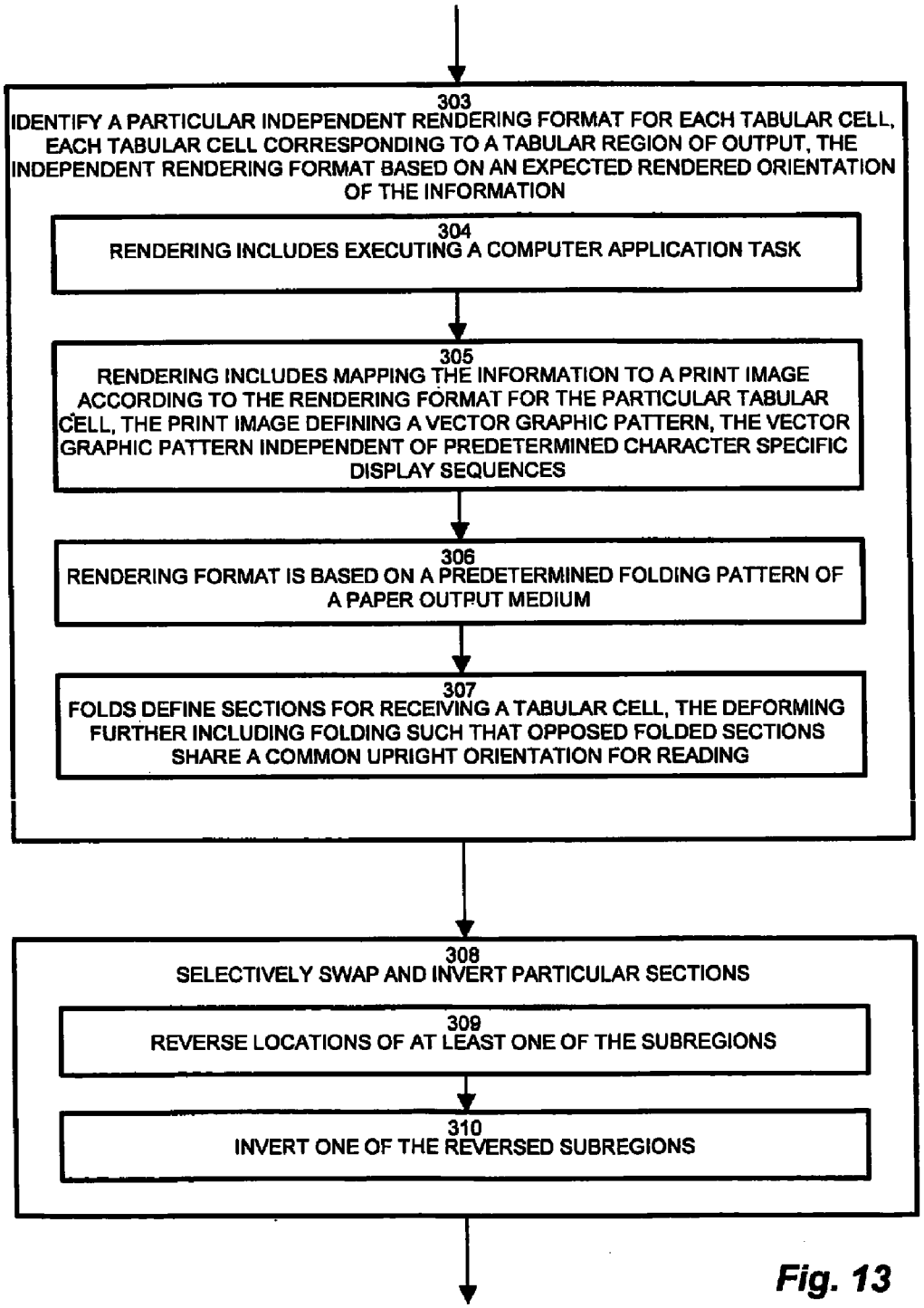
Figure 14:
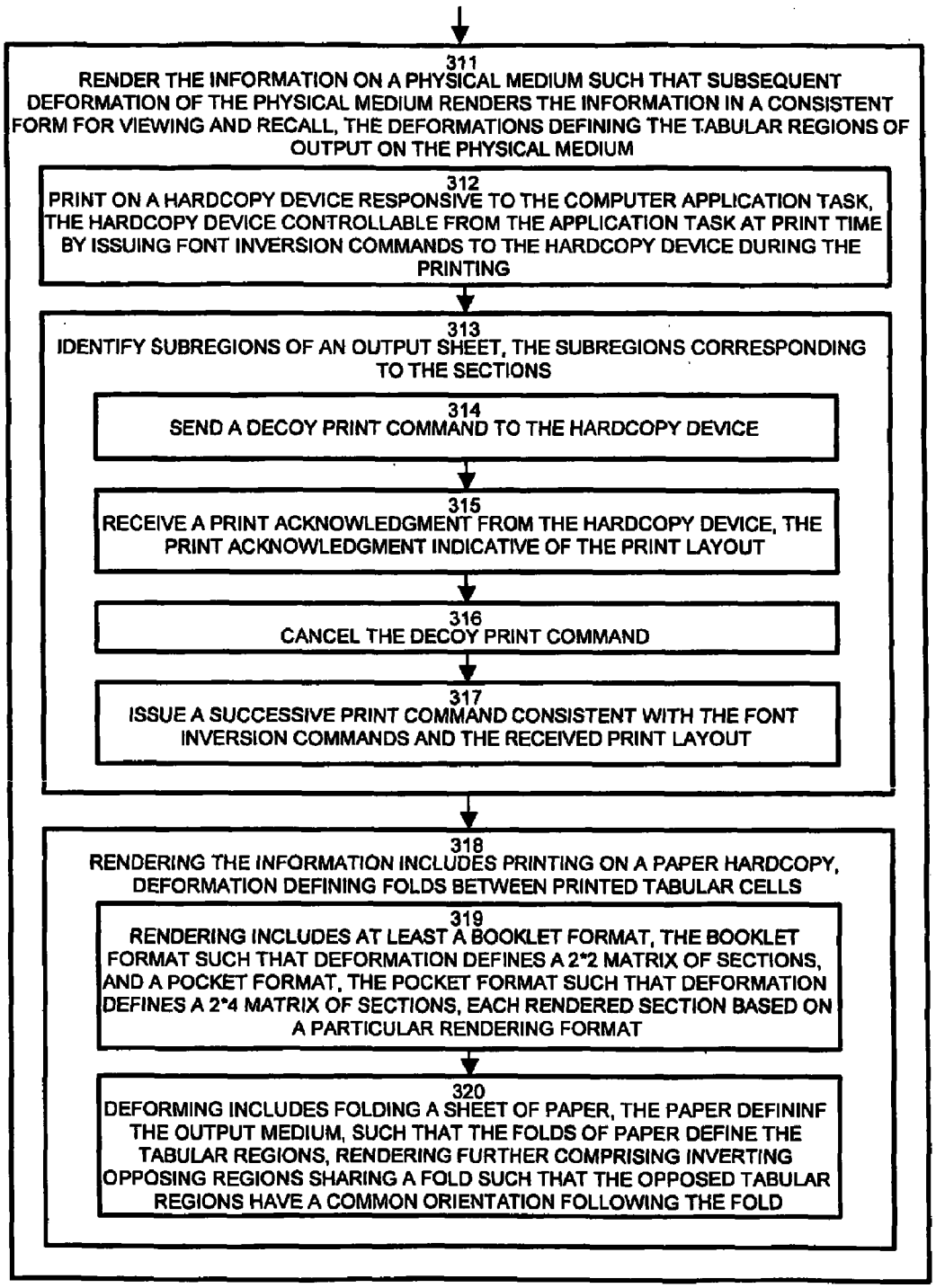

FIGS. 12-14 show a flowchart of rendering the hardcopy output of FIGS. 6a-6d. Referring to FIGS. 1 and 12-14, the method of coordinating rendered output among multiple visual display mediums as disclosed above includes identifying a set of information for efficient recall, as depicted at step 300. The information takes the form of items 116, which may be schedule items 116-1, event items 116-2, or web entries 116-3. The scheduling application 110 demarcates the information in a tabular form, such that the tabular form defines tabular cells including a portion of the information, as shown at step 301. The scheduling application 110 stores, organizes, and presents the items 116 in a chronological organization based on the user selections form FIG. 1, defining a particular flow (states) as shown in FIG. 5. The tabular form refers to items 116 printed on a particular section 141 of the hardcopy output 140, and typically includes a set of hours, days, or weeks as directed by the scheduling application 110. The tabular form thus denotes date specific sections 141 in each tabular cell, such that the date specific section of each cell covers a particular time range and has a predetermined format, as depicted at step 302.

The scheduling application 110 receives user input for identifying a particular independent rendering format for each tabular cell, in which each tabular cell corresponds to a tabular region of output. The output region, or section 141, is such that the independent rendering format is based on an expected rendered orientation of the information, as depicted at step 303. Thus, rendering includes executing a computer application task 110, as shown at step 304, and mapping the identified information to a print image according to the rendering format for the particular tabular cell, such that the print image defines a vector graphic pattern, in which the vector graphic pattern is independent of predetermined character specific display sequences, as disclosed at step 305. The rendering format defines the folds to be made in the hardcopy output 140 (paper), such that the fold lines 150 define or separate the tabular cells, or sections 141 on the paper. Since the vector graphics output defines the print area as a set of lines (vectors), and not as a character cell, individual sections 141 are invertible such that they appear upright after a fold that would have otherwise resulted in text appearing upside down.

The selected rendering format 534, 536 538 is based on a predetermined folding pattern of a paper output medium 140, as disclosed at step 306 and shown in FIGS. 6a-6d. The folds 150 therefore define sections 141 for receiving a tabular cell, in which the deforming therefore includes folding such that opposed folded sections 141 share a common upright orientation for reading, as shown at step 307.

From the selected rendering format, the scheduling application 110 selectively swaps and inverts particular sections 141, as depicted at step 308, such that subsequent folding results in the desired post-folding orientation. This may include, at step 309, reversing locations of at least one of the subregions, or sections 141, and inverting one of the reversed subregions, as shown at step 310.

Following computation of the inversion for the print image, the scheduling application 110 renders the information on a physical medium 140 such that subsequent deformation of the physical medium renders the information in a consistent form for viewing and recall. The deformations define the tabular regions of output on the physical hardcopy output 140 medium, as depicted at step 311. Rendering includes printing on a hardcopy device 144' responsive to the computer application 110 task, in which the hardcopy device 144' such as the example printer 144 is controllable from the application 110 task at print time by issuing font inversion commands to the hardcopy device 144' during the printing, as disclosed at step 312. Issuing the font inversion command 142 includes identifying subregions of an output sheet, in which the subregions correspond to the sections 140, as shown at step 313. As indicated above, font inversion incorporates vector, rather than character cell, printing organization such that the scheduling application 110 controls the printer directly, rather than passively sending an encoded page (such as ASCII codes and font designations). Therefore, controlling the hardcopy device 144' includes sending a decoy print command 142 to the hardcopy device 144', as depicted at step 314, and receiving a print acknowledgment 143 from the hardcopy device 144', such that the print acknowledgment 143 is indicative of the print layout of the printer 144, as disclosed at step 315. The scheduling application 110 then cancels the decoy print command, having received the current print layout settings of the printer 144, shown at step 316, and issues a successive print command 142 consistent with the font inversion commands and the received print layout 143, as shown at step 317. The decoy print command 142 enables the scheduling application 110 to initialize settings to print vector graphic patterns on the printer 144, therefore allowing sections 141 to be inverted independently.

Rendering the information includes printing on a paper hardcopy 140, shown at step 318, such that the deformation defines folds between printed tabular cells 141. The folds are defined by fold lines 150, also printed on the hardcopy output 140, according to one of the rendering formats including pocket 534, booklet 536 and classic 538. Rendering therefore further includes at least a booklet 536 format, in which the booklet format is such that deformation defines a 2*2 matrix of sections, and a pocket 536 format, in which the pocket format is such that deformation defines a 2*4 matrix of sections, so that each rendered section 141 is based on a particular rendering format, as depicted at step 319. The subsequent deforming includes folding a sheet of paper defining the hardcopy output 140 medium, such that the folds 140 of paper define the tabular regions, or sections 141, in which rendering may further include inverting opposing regions sharing a fold so that the opposed tabular regions have a common orientation following the fold, as shown at step 320.

Figure 15:
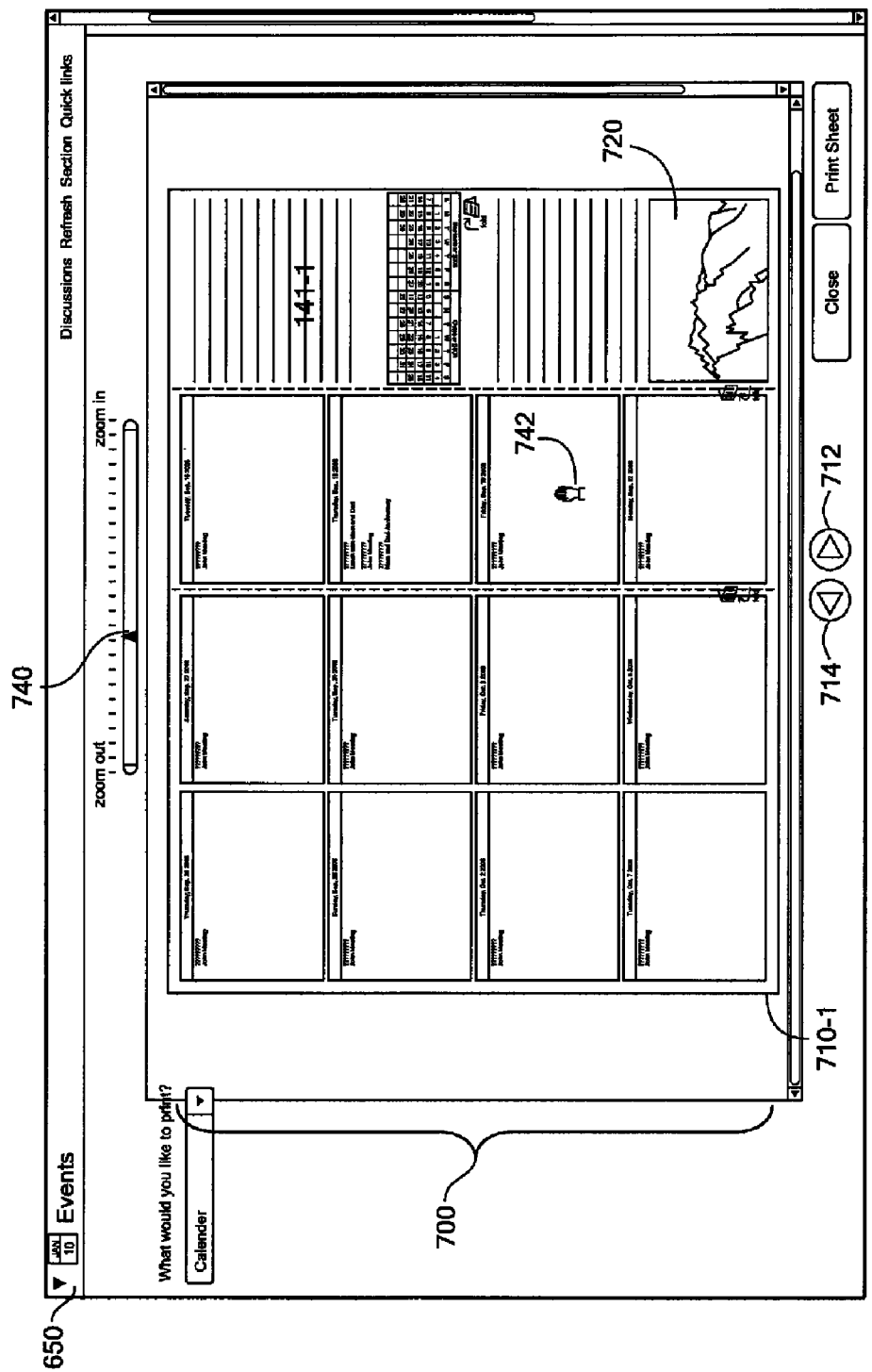

FIGS. 15-18 show alternate configurations 710-1 ... 710-4 of screen rendering of physical hardcopy output. Referring to FIGS. 1, 5 and 15, a rendered output screen 650 shows the hardcopy output 140 as it would appear in a form commonly known as WYSIWYG (What you see is what you get) interface. The following progression of screens 15-18 depicts WYSIWYG screen shown each fold, or deformation 150, to the hardcopy output 140 including the inversions and swapping performed by the scheduling application 110. Thus, this sequence depicts multiple output devices including a screen display and paper printer, further including displaying, on the screen, the deformation of the physical medium, such that the screen display renders a progression of successive deformations 150 as in FIG. 5. A rendered output window 700 depicts the hardcopy output, and progression buttons for forward 712 and backward 714 advance and reverse the hardcopy output 140 for each fold 150. An initial output 710-1 shows the true appearance of the hardcopy output 140 including inverted section 141-1. A picture icon shows the use of an external interface, such as to a web page, for downloading notes including pictorial, text, or other media item to the hardcopy output 140.

Figure 16:
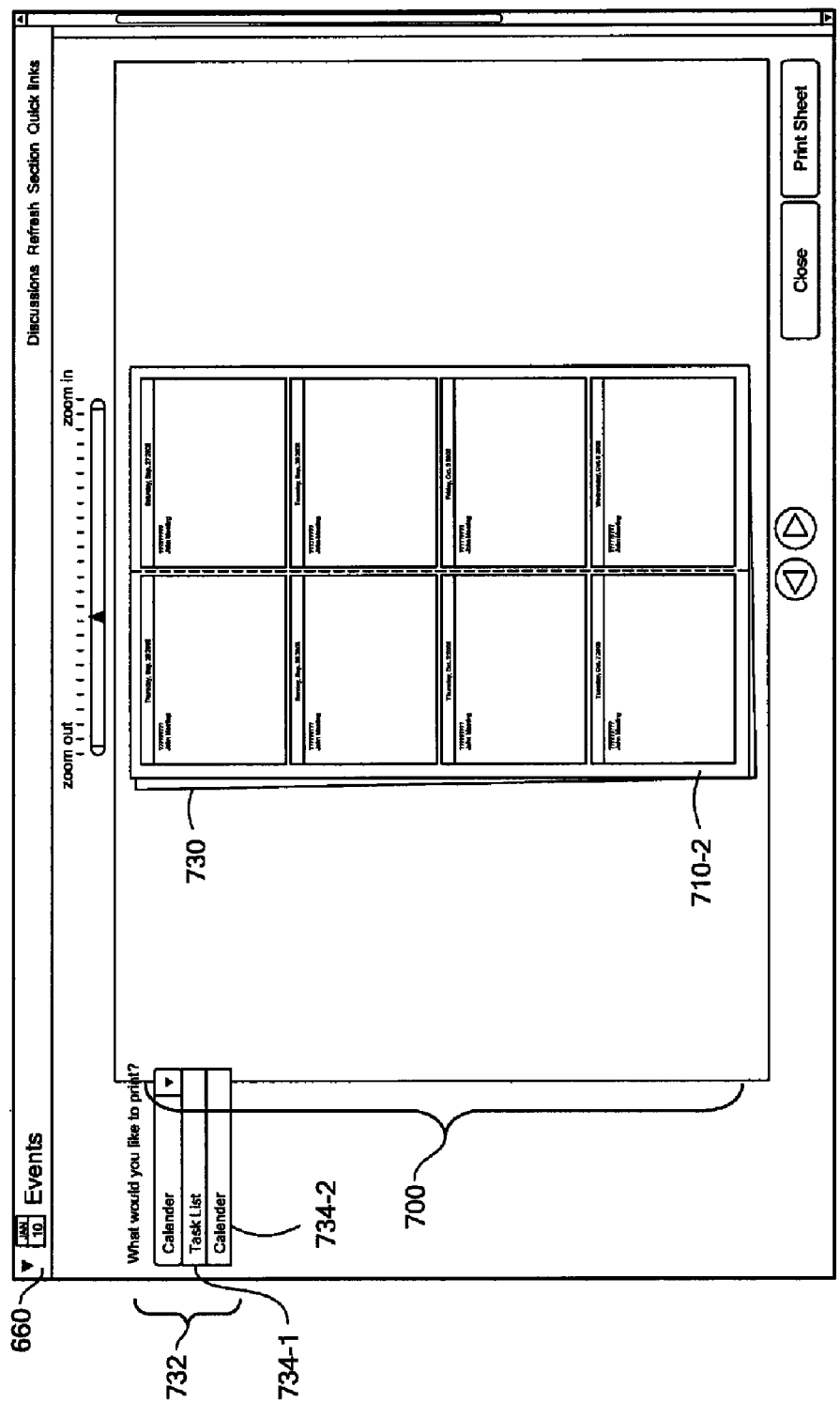

In FIG. 16, once-folded window 660 shows a single fold 710-2 form of the hardcopy output 140, emphasized by a shadow 730 feature illustrating the folded appearance from 710-1. Pointer icon 742 may be invoked to manipulate the screen form 710-2, and a zoom slider 740 may be invoked to enlarge or reduce the form 710-2 in the rendered output window 700. Further, an output form list 732 allows user commands to select display of the task list 734-1 or the calendar 734-2.

Figure 17:
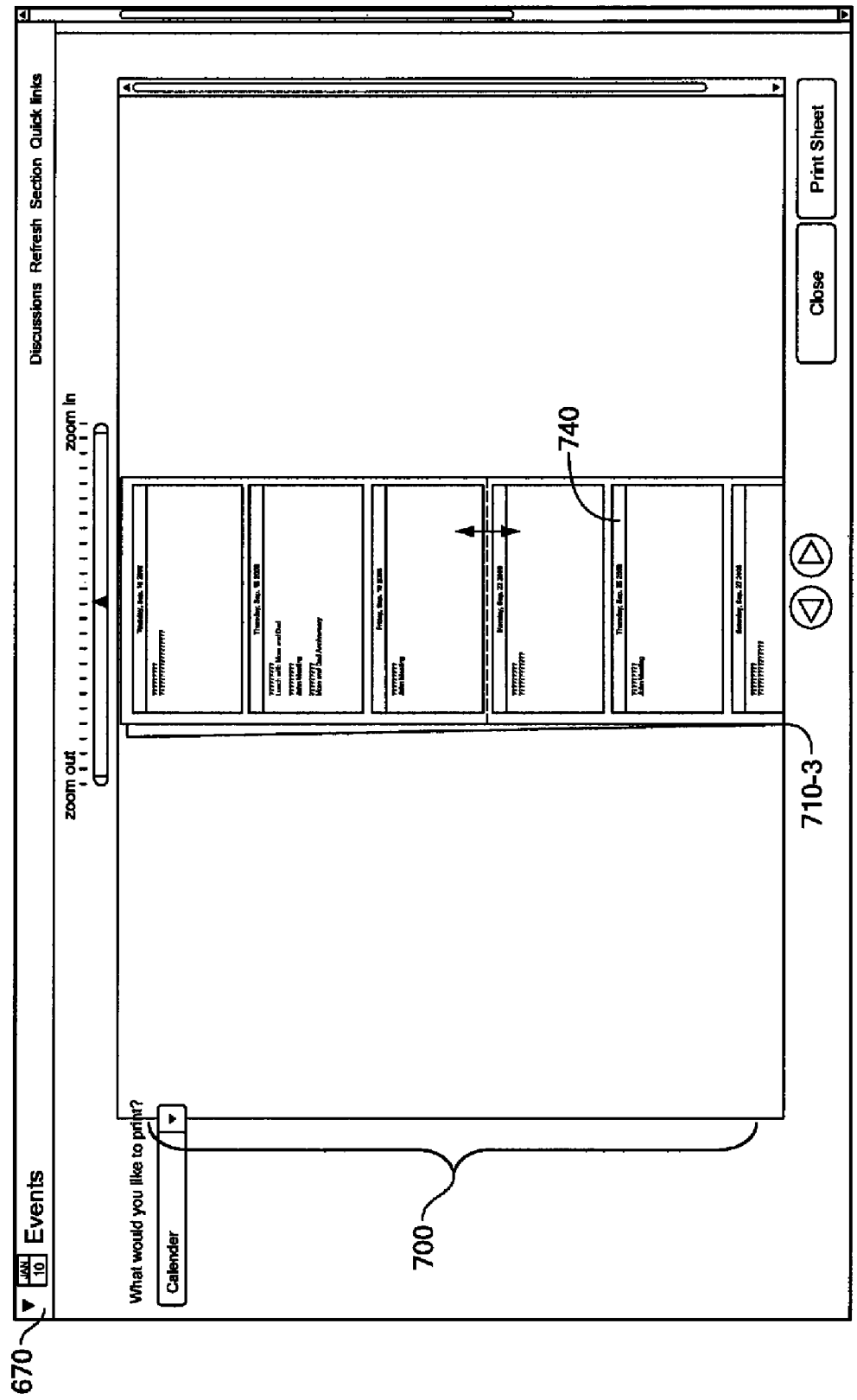

FIG. 17 shows a twice folded window 670 in which the rendered output window 700 show a twice folded 710-3 appearance of the hardcopy output. A further illustrated feature in which the date specific section of a particular cell (section 140) having a number of days is modifiable by the graphical user interface 112. A date divider line 740 on the display is slidably engaged to extend or retract the area devoted to a particular day, and the number of days displayed responds accordingly. In this manner, additional days may be displayed in each section 140 by contracting the area available to each day, as in the case of a sparse schedule.

Figure 18:
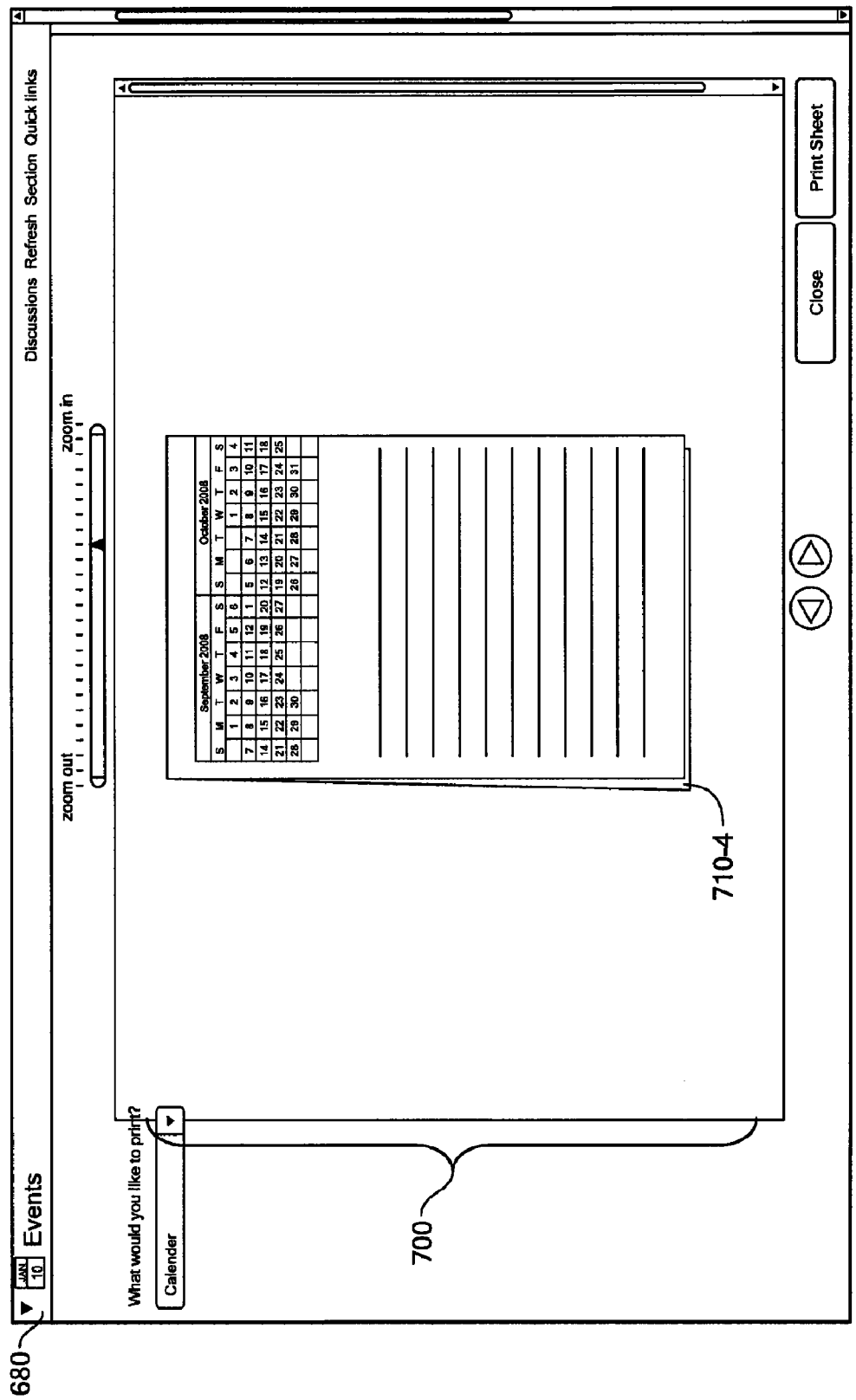

FIG. 18 shows a final output 680 screen rendering the hardcopy output 140 following a third fold 710-4. The inverted section 141-1 is now shown folded over such that it has a common upright appearance as the opposed side.

Those skilled in the art should readily appreciate that the programs and methods for coordinating rendered output as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for coordinating rendered output has been particularly shown and described with references to embodiments thereof, it will be understood by those skilled in the art that various changes in form and details may be made therein without departing from the scope of the invention encompassed by the appended claims.

What is claimed is:

1. A method of coordinating rendered output among multiple visual display mediums, comprising identifying a set of information for user recall;

demarcating the information in a tabular form, the tabular form defining tabular cells including a portion of the information;

identifying a particular independent rendering format for each tabular cell, each tabular cell corresponding to a tabular region of output, the independent rendering format based on an expected rendered orientation of the information; and rendering the information on a physical medium such that subsequent deformation of the physical medium renders the information in an upright orientation for viewing and recall, the deformations defining the tabular regions of output on the physical medium;

rendering the information including printing on a paper hardcopy, deformation defines folds between printed tabular cells, the folds defining sections for receiving a tabular cell, and the deformation further including folding such that opposed folded sections share a common upright orientation for reading; and rendering further includes at least a booklet format, the booklet format such that deformation defines a 2*2 matrix of sections, and a pocket format, the pocket format such that deformation defines a 2*4 matrix of sections, each rendered section based on a particular rendering format.

2. The method of claim 1 wherein the tabular form denotes date specific sections in each tabular cell, the date specific section of each cell covering a particular time range and having a predetermined format, the date specific section of a particular cell having a number of days modifiable by a graphical user interface.

3. The method of claim 1 wherein rendering includes executing a computer application task, rendering including printing on a hardcopy device responsive to the computer application task, the hardcopy device controllable from the application task at print time by issuing font inversion commands to the hardcopy device during the printing.

4. The method of claim 3 wherein controlling the hardcopy device further includes:
   sending a decoy print command to the hardcopy device;
   receiving a print acknowledgment from the hardcopy device, the print acknowledgment indicative of the print layout;
   canceling the decoy print command; and
   issuing a successive print command consistent with the font inversion commands and the received print layout.

5. The method of claim 4 wherein issuing the font inversion commands includes
   identifying subregions of an output sheet, the subregions corresponding to the sections, and performing at least one of:
      reversing locations of at least one of the subregions; or
      inverting one of the reversed subregions.

6. The method of claim 1 further comprising selectively performing at least one of swapping or inverting particular sections, the swapped and inverted sections visible on a screen display prior to printing.

7. The method of claim 1 wherein the rendering format is based on a predetermined folding pattern of a paper output medium.

8. The method of claim 1 wherein the deformation includes folding a sheet of paper, the paper defining the output medium, such that the folds of paper define the tabular regions, rendering further comprising inverting opposing regions sharing a fold such that the opposed tabular regions have a common orientation following the fold.

9. A method of coordinating rendered output among multiple visual display mediums, comprising
   identifying a set of information for user recall;
   demarcating the information in a tabular form, the tabular form defining tabular cells including a portion of the information;
   identifying a particular independent rendering format for each tabular cell, each tabular cell corresponding to a tabular region of output, the independent rendering format based on an expected rendered orientation of the information;
   rendering the information on a physical medium such that subsequent deformation of the physical medium renders the information in an upright orientation for viewing and recall, the deformations defining the tabular regions of output on the physical medium;
   rendering the information includes printing on a paper hardcopy, deformation defines folds between printed tabular cells, the folds defining sections for receiving a tabular cell, and the deformation further including folding such that opposed folded sections share a common upright orientation for reading;
   rendering includes executing a computer application task, rendering including printing on a hardcopy device responsive to the computer application task, the hardcopy device controllable from the application task at print time by issuing font inversion commands to the hardcopy device during the printing; and
   rendering includes mapping the information to a print image according to the rendering format for the particular tabular cell, the print image defining a vector graphic pattern, the vector graphic pattern independent of predetermined character specific display sequences.

10. A schedule rendering device for coordinating rendered output among multiple visual display mediums, comprising:
   a user interface for identifying a set of information for user recall;
   a scheduling application for demarcating the information in a tabular form, the tabular form defining tabular cells including a portion of the information;
   an output selector in the user interface for identifying a particular independent rendering format for each tabular cell, each tabular cell corresponding to a tabular region of output, the independent rendering format based on an expected rendered orientation of the information; and
   an interface to an output device for rendering the information on a physical medium such that subsequent deformation of the physical medium renders the information in an upright orientation form for viewing and recall, the deformations defining the tabular regions of output on the physical medium;
   the interfaced output device renders the information including printing on a paper hardcopy, deformation defines folds between printed tabular cells, the folds defining sections for receiving a tabular cell and the deformation further including folding such that opposed folded sections share a common upright orientation for reading;
   executing the scheduling application as a computer application task, the interface being responsive to the scheduling application, rendering including printing on a hardcopy device responsive to the computer application task, the hardcopy device controllable from the application task at print time by issuing font inversion commands to the hardcopy device during the printing;

the hardcopy device being responsive to the scheduling application, the scheduling application invoking the interface for:

sending a decoy print command to the hardcopy device;

receiving a print acknowledgment from the hardcopy device, the print acknowledgment indicative of the print layout;

canceling the decoy print command; and issuing a successive print command consistent with the font inversion commands and the received print layout.

11. The schedule rendering device of claim 10 wherein rendering further includes at least a booklet format, the booklet format such that deformation defines a 2*2 matrix of sections, and a pocket format, the pocket format such that deformation defines a 2*4 matrix of sections, each rendered section based on a particular rendering format.

12. The schedule rendering device of claim 10 wherein rendering includes mapping the information to a print image according to the rendering format for the particular tabular cell, the print image defining a vector graphic pattern, the vector graphic pattern independent of predetermined character specific display sequences.

13. The schedule rendering device of claim 10 wherein the scheduling application issues the font inversion command by identifying subregions of an output sheet, the subregions corresponding to the sections; reversing locations of at least one of the subregions; and inverting one of the reversed subregions.

14. The schedule rendering device of claim 10 wherein the deformation includes folding a sheet of paper, the paper defining the output medium, such that the folds of paper define the tabular regions, rendering further comprising inverting opposing regions sharing a fold such that the opposed tabular regions have a common orientation following the fold.

15. The schedule rendering device of claim 10 wherein the output device include a screen display and paper printer, further comprising displaying, on the screen, the deformation of the physical medium, the screen display rendering a progression of successive deformations.

16. The schedule rendering device of claim 10 wherein the information includes events having a time and duration and notes having fixed information, further comprising receiving, by the scheduling application, a user command, the user command performing at least one of:

modifying the size of the displayed information;

receiving information from an external information interface;

arranging the order of displayed information; and removing displayed information.

* * * * *